United States Patent [19]

Insolio

[11] 4,226,153
[45] Oct. 7, 1980

[54] COMPENSATING GLASS SCORING HEAD

[75] Inventor: Thomas A. Insolio, Bristol, Conn.

[73] Assignee: The Fletcher-Terry Company, Farmington, Conn.

[21] Appl. No.: 39,858

[22] Filed: May 17, 1979

[51] Int. Cl.³ .......................... B26D 3/08; C03B 33/10
[52] U.S. Cl. ....................................... 83/881; 83/582; 83/886; 225/96
[58] Field of Search ................. 83/881, 886, 879, 582; 225/2, 96.5, 96

[56] References Cited

U.S. PATENT DOCUMENTS

| | | | |
|---|---|---|---|
| 3,280,676 | 10/1966 | Grzymislanwski | 83/881 |
| 3,742,793 | 7/1973 | Gray et al. | 83/881 |
| 3,821,910 | 7/1974 | Tjaden | 83/881 |
| 4,137,803 | 2/1979 | Goldinger | 83/881 |

Primary Examiner—Frank T. Yost
Attorney, Agent, or Firm—McCormick, Paulding & Huber

[57] ABSTRACT

A glass scoring head which compensates for variation in the flatness of the glass to provide a score of uniform depth as it traverses the glass has an outer body adapted to be mounted in four possible positions to a bridge or the like to score glass in four different directions. This support body defines an air cylinder with an elongated annular piston means movably mounted therein. A pair of pressure rollers are journalled on the lower end of the piston means to bear on the glass with a force proportional to the air pressure in this cylinder. An elongated support tube is slidably mounted inside the annular piston means, and a second air cylinder urges the tube downwardly to supplement a spring acting between the second air cylinder piston and the tube. The glass scoring wheel is mounted in the lower end of the elongated tube, and threaded stop nuts are provided on the annular piston and on the support tube to adjust the down limit position of these pressure rollers, and the differential spacing between these rollers and the scoring wheel.

9 Claims, 8 Drawing Figures

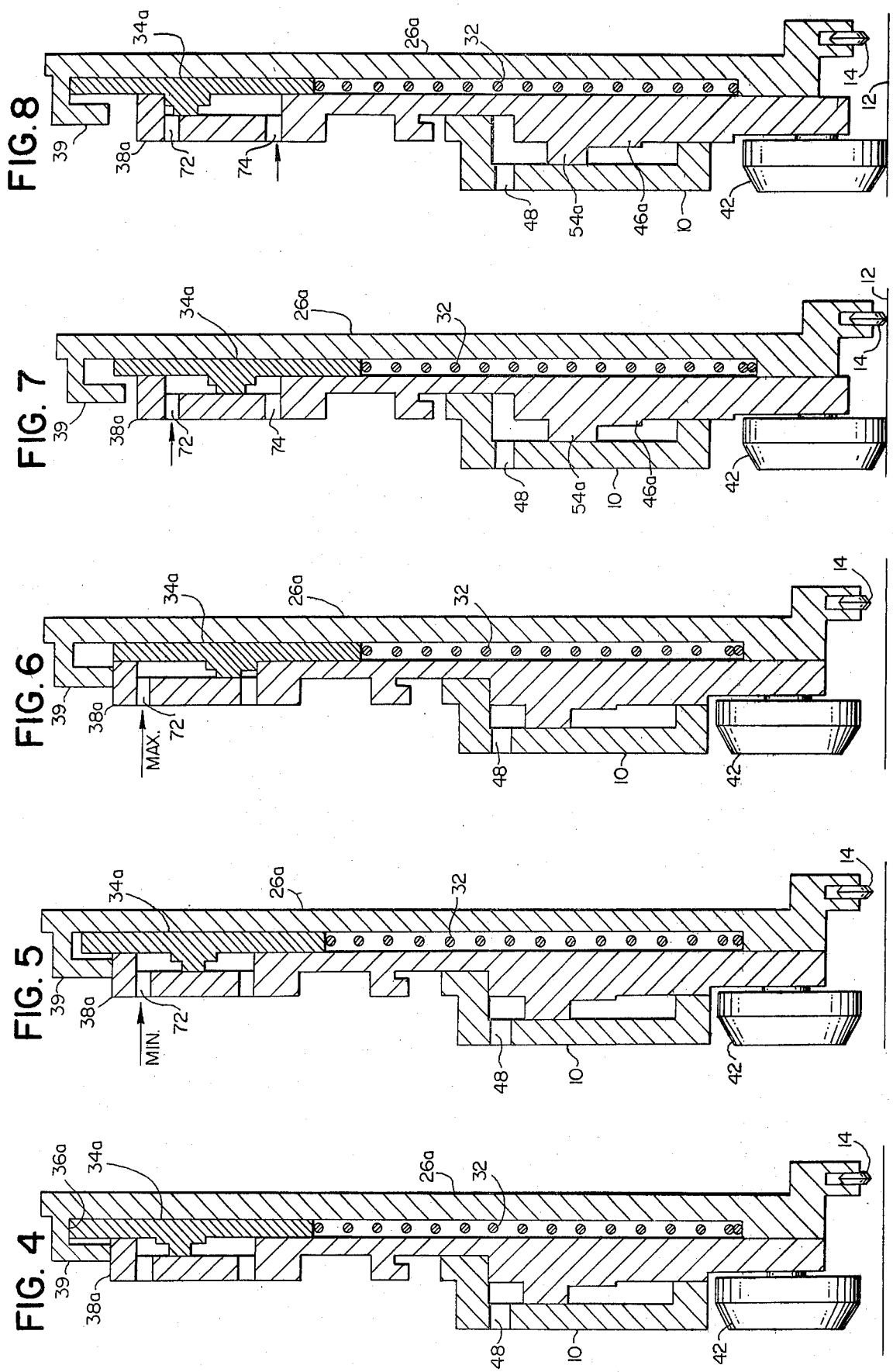

COMPENSATING GLASS SCORING HEAD

SUMMARY OF THE INVENTION

This invention relates generally to apparatus for scoring flat sheets of glass while supported on a table, and deals more particularly with a compensating head adapted to score the glass to a depth independent of variations in the flatness of the glass being scored.

Prior art glass scoring heads have been provided with the cabability of accommodating variations in the flatness of the glass, but generally such prior art cutting heads have employed the use of levers and adjustable springs in cumbersome structures of the type shown and described in U.S. Pat. No. 3,280,677 to Grzymislawski and U.S. Pat. No. 4,098,155 issued to Insolio.

The general aim of the present invention is to provide a more compact compensating head for a glass cutter such that no projecting levers or the like are required, and so that fluid pressure is used at least in part to achieve the capability of retracting and extending both the cutting wheel and associated pressure rollers in order to improve the versatility of the compensating scoring head.

In summary, a compensating head of the present invention is well adapted for use in scoring sheet glass laid flat on a table or the like, particularly when the surface of the glass to be scored may not be perfectly flat, or when the bridge structure upon which the head is mounted may itself deflect in different amounts dependent upon the distance between the head and the support for such bridge structure. The apparatus of the present invention preferably comprises a generally rectangular support body adapted for movement in a plane generally parallel to the glass to be scored, and piston means of annular configuration reciprocably received in the support body with a lower portion having side-by-side pressure rollers mounted to the side walls of the annular piston. A support tube is slidably received in a central bore of this piston, with an elongated stem provided for supporting the glass cutting wheel between the pressure rollers and at the lower end of the support tube. A coil compression spring biases the support tube downwardly, and an air cylinder, associated with the upper end of the annular piston and the support tube, provides additional force on the cutting wheel which cutting wheel is at all times independent of the relative position of the annular piston and the pressure wheels as the head traverses the glass sheet being scored.

BRIEF DESCRIPTION OF THE DRAWINGS

FIGS. 4, 5, 6, 7 and 8 are schematic views illustrating the relative positions between certain components of the compensating head depicted in detail in FIG. 2, but also illustrating a modification to that head such that a "skip" position is provided as illustrated in FIG. 8.

DETAILED DESCRIPTION

Figure 1:
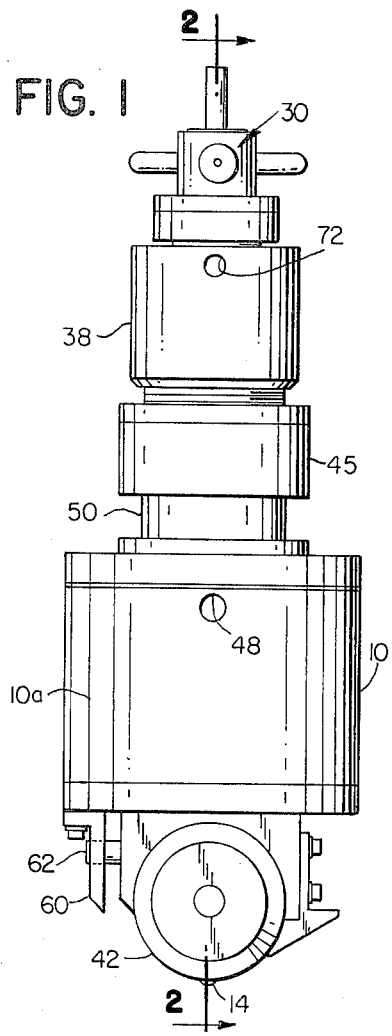
FIG. 1 is a side elevational view illustrating a compensating cutting head incorporating the present invention.

In machines for scoring sheet glass on a production basis relatively large glass sheets are layed on a table or the like with a bridge structure provided thereabove, to permit traversing the sheet with a scoring head, or the scoring head might be fixed with the sheet glass being moved across beneath the head in order to provide the desired score line. The present disclosure relates to the scoring head, and in a typical installation the scoring head of FIG. 1 is provided with a support body 10 which may be mounted to such a bridge structure in fixed relationship to a trolley or carriage on the bridge to score the glass in accordance with conventional practice. The body 10 preferably has a rectangular shape to permit it to be mounted on any one of its four mutually perpendicular sides (only one of which sides appears in FIG. 1 at 10a).

The compensating cutting head of the present invention is designed to apply a constant force to the cutting wheel as the wheel scores the surface of the glass and the head to be described has particular advantages when used in scoring relatively large sheets of glass. In these situations it is often not economically feasible to provide a perfectly flat planar upper surface for the table so that the upper surface of the sheet of glass to be scored will be truly flat, that is the glass may have undulations or variations in the upper surface requiring mechanism for compensating for these variations and still apply a constant force to the glass for the scoring operation. The characteristics of a mechanical spring preclude use of a single spring for this purpose. Furthermore, the bridge or support structure above the surface of the glass for supporting the cutting head may itself be subject to deflections, again requiring some sort of compensating system in the cutting head for accommodating variations in the position of the head relative to the glass being scored.

Figure 2:
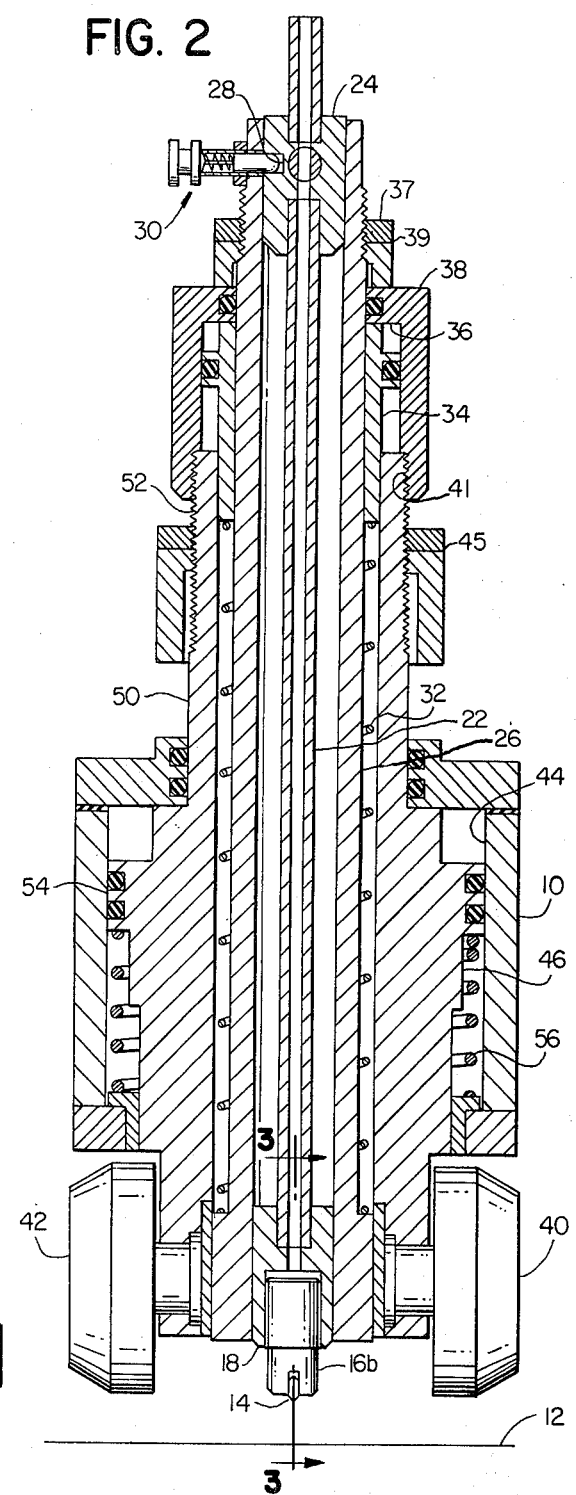
FIG. 2 is a longitudinal sectional view taken generally on the line 2—2 of FIG. 1.

With particular reference to FIG. 2 of the drawings, the upper surface of the sheet glass to be scored is shown at 12, and the support body 10 is provided on a suitable bridge structure or the like (not shown) to permit the compensating head of FIG. 2 to traverse the glass sheet 12 with the glass scoring wheel 14 lowered from the position shown to the position illustrated schematically in FIG. 7 by the mechanism to be described. The scoring wheel 14 is provided in a conventional pillar post 16, and this pillar post itself provides for a castering action for the scoring wheel 14 as suggested in FIG. 3, in that the upper portion 16a of the pillar post 16 is securely held in the lower end 18 of a support stem by set screw 20 but this portion 16a allows for limited rotation of the lower portion 16b of the pillar post which carries the scoring wheel 14 in order to achieve this castering action. The support stem 18 for the pillar post 16 comprises an elongated member including the lower end for receiving the pillar post, a tubular intermediate portion 22, and an upper end 24, which includes means for releasably retaining the elongated stem 18, 22, 24 in a support tube 26 to be described. The support tube 26, in conjunction with the portions 18, 22 and 24 comprising the elongated stem for the pillar post, together comprise glass scoring wheel support means, and all of these components are equivalent to the member schematically depicted in FIGS. 4-8 inclusively as a single part 26. These Figs. illustrate schematically the various motions between this part and other components of the compensating head in an alternative embodiment very similar to that of FIGS. 1-3, but different enough to warrant adding the subscript a to corresponding parts.

The means for releasably retaining the elongated stem 22 in the upper end of the support tube 26 comprises an upper plug member received in the upper end of the support tube and generally similar to the lower plug member which retains the pillar post 16. This upper plug member has an opening 28 for receiving a spring loaded plunger 30 mounted in the sidewall of the upper end of the support tube 26 and the means for releasably retaining the elongated stem 22 in the upper end of the support tube 26 comprises a spring loaded plunger mechanism mounted in the sidewall of the support tube 26 adjacent its upper end, with the plunger shown as being received in a bore provided for this purpose in the plug member at the upper end 24 of the stem.

Means is provided for baising the scoring wheel 14 downwardly, and as best shown in FIG. 2 said means comprises a coiled compression spring 32 having its lower end acting on a flange provided for this purpose at the lower end of the support tube 22, the upper end of the spring 32 acting against the downwardly facing lower end of a sleeve or piston 34. The piston 34 is shown with its upper end in engagement with the end wall 36 of a cylinder 38, secured by means to be described in a predetermined position relative to the lower peripheries of two rollers 40 and 42 which engage the glass being scored. FIG. 4 shows this configuration in schematic fashion, but with a slightly different cooperation between the piston sleeve 34a corresponding to the piston 34 in FIG. 2, and the inner end wall 36a of the cylinder 38a. In the alternative embodiment of FIG. 4 the cylinder head is defined by a portion of the support tube 26a for the cutting wheel 14, rather than by the inner surface of the head 38a. However the configurations shown in FIGS. 2 and 4 are identical from a functional point of view in that the glass scoring wheel 14 is maintained at a predetermined distance below the lower peripheral surface of pressure rollers 40 and 42. These rollers 40 and 42 are provided movably in the support body for limited reciprocating movement on the same line of action as the downwardly biased scoring wheel stem 22.

The scoring wheel 14 normally projects slightly below the lower peripheral surface of the pressure rollers 40 and 42, at least when glass is not being scored and the pressure rollers are not in contact with the glass, and this differential is preset to achieve the desired downward force from the spring 32 as a result of adjusting the position of a nut 39 threadably received on the tube 26 and adapted to engage the upper, or outside of cylinder 38. A lock nut 37 assures that this differential does not change after being so set.

Turning now to a more detailed description of the means provided for supporting the pressure rollers 40 and 42, FIG. 2 shows the support body 10 which is mounted to the bridge structure as described previously for either traversing the glass sheet to be cut, or for supporting the scoring wheel in a stationary position such that the glass sheet 12 can be passed beneath a compensating head of the present invention. These rollers 40 and 42 are normally biased downwardly by fluid pressure to overcome the force of spring 56 and provide a net force in excess of that for the scoring wheel 14. A stop nut 45 provides a down limit adjustment for these rollers with fluid pressure applied to annular piston 46, but without any resistance to downward movement of the rollers 40 and 42, as by reason of the glass 12 not in position for actual scoring.

The support body 10 defines a cylindrical chamber 44 for slidably receiving the piston means 46, and the pressure rolls 42 and 40 are journalled in the lower end of said piston means so as to be urged downwardly against the glass sheet 12, as suggested in FIGS. 7 and 8, when fluid under pressure is supplied to the port 48 in the support body. The piston means 46 not only includes the downwardly projecting portion for the pressure wheels 40 and 42 but also includes an upwardly extending portion 50 which is preferably threaded externally as shown at 52 in order that the lower internally threaded end portion 41 of fluid cylinder 38 can be secured thereto. Finally, and still with reference to the piston means 46, the intermediate annular portion thereof, indicated generally at 54 in FIG. 2 and 54a in FIGS. 4-8 inclusively, defines the annular piston itself.

As shown in FIG. 2, the piston means 46 is biased downwardly as a result the introduction of fluid under pressure through port 48, and is spring returned by means of the coiled compression spring 56. In the down position, best shown in FIGS. 7 and 8, the piston means 46a is urged downwardly so that the pressure roll 42 will always remain in contact with the surface of the glass 12 while the glass is being scored as suggested in FIG. 7, or while the scoring is interrupted briefly depending upon the particular pattern being made on the glass sheet being so scored as suggested in FIG. 8.

Figure 3:
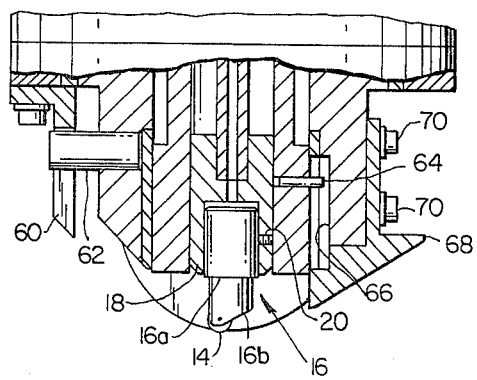
FIG. 3 is a sectional view to the lower portion of the head depicted in FIG. 2, being taken on the line 3—3 of that view.

Means is provided for preventing rotation of the piston means 46 in the support body 10, and more particularly in the cylindrical chamber 44, and preferably said means comprises a depending bracket 60 which is furcated to define a downwardly open slot for receiving the pin 62 permanently secured in the lower end portion of the piston means 46 at the rear side of this annular piston means. FIG. 3 shows this rotation preventing pin and slot means for the annular piston means 46. Means is also provided for preventing rotation of the glass scoring wheel support means, and particularly the support tube 26, and a pin 64 similar to the pin 62 extends forwardly in the direction of score (as shown in FIG. 3) to cooperate with a slot 66 provided for this purpose in the lower end of the annular piston 46 and located in diametrically opposed relationship to the pin 62.

A removable deflector bracket 68 is provided on the lower end of the annular piston 46 by means of the screws 70, 70 in order to define a lower limit of axial movement for the glass scoring wheel support stem and tube, while permitting removal of the said bracket 68 as required for access to the pillar post itself for replacement or repair. A central bore in the stem 22 is provided for assuring a supply of cutting fluid to the scoring wheel 14 at the lower end of the pillar post described above. The pillar post itself includes a central opening for the passage of such fluid internally thereof.

Turning now in somewhat greater detail to FIGS. 4-8 inclusively, these views illustrate an alternative embodiment for the head of FIGS. 1, 2 and 3, but it is noted that the only significant difference between these two embodiments resides in the upper end of the FIGS. 4-8 embodiment including, as an additional feature, the score skipping capability alluded to previously. FIG. 8 shows the piston 34a as slightly different in geometry than the piston 34 of FIG. 2, and the upper end of the piston 34a extends through the top wall of the cylinder 38a to engage the stop structure indicated schematically at 39 in order to provide an alternative position for the scoring wheel support means 26a in which the pressure roller 42 is mounted for engagement with the glass 12.

The scoring wheel itself is capable of being raised to an inactive position best shown in FIG. 8. The head of views 4-7 inclusively operates in substantially the same manner as the head described above with reference to FIGS. 1, 2 and 3, and the only difference resides in the fact that with the pressure roller 42 and cutting wheel 14 in their respective raised positions best shown in FIG. 4 and corresponding functionally to the position shown for the scoring wheel 14 of FIG. 2, the upper end of the piston 34a is again in engagement with the inside surface of the stop structure 39, rather than engaging the inside or head of piston 38 as was true in the FIG. 2 embodiment (See cylinder 38 and piston 34).

FIGS. 5 and 6 are identical except for the notation that the air pressure provided at the top port of cylinder 38a is a minimum in FIG. 5 and a maximum in FIG. 6. This illustrates the fact that the differential force at the scoring wheel 14, for supplementing the force of the spring 32, can be varied by varying the fluid pressure exerted by the piston 34a of FIG. 7. The pressure provided at port 72 may be intermediate the minimum and maximum referred to in FIGS. 5 and 6, and will preferably provide a sufficient supplement to the force provided by the spring 32 such that the desired depth of score is achieved with the particular cutting wheel 14 which is used. As referred to previously, FIG. 8 illustrates a skip scoring configuration for the compensating head wherein pressure is applied at port 74 to raise the piston 34a without altering the configuration for piston 46a and hence leaving pressure roller 42 on the surface of the glass 12 while momentarily lifting the scoring wheel 14 from its scoring position of FIG. 7 to an inactive position in order to provide short gaps of score during operation of the head. Sometimes when the head is scoring at right angles to a previous score line already made in the glass, it is desirable to interrupt the score being made to cause the cutter wheel to skip across the previous score. The configuration of FIG. 8 permits a very short blast of high pressure air to be introduced at port 74 to momentarily nullify the cutting in pressure (if used) at port 72 to achieve this "skip" in the scoring operation.

I claim:

1. Apparatus for scoring sheet glass, comprising a support body adapted for relative movement in a plane generally parallel to the glass to be scored, piston means in said support body and adapted for limited reciprocating movement on a line oriented perpendicular said plane, glass scoring wheel support means reciprocably mounted in said piston means for limited movement on the same line of action as that of said piston means, a glass scoring wheel rotatably mounted in said reciprocable wheel support means for limited angular castering action on the said line of action, at least one glass contacting pressure roller mounted to said piston means for rotation on an axis oriented parallel to the axis of rotation of said glass scoring wheel and said roller axis intersecting said line of action for said piston means and said scoring wheel support means, biasing means acting between said support body and said piston means to provide a predetermined pressure for said roller to exert on the glass, and biasing means acting between said piston means and said scoring wheel support means to provide a cutting force for the scoring wheel which is independent of the pressure of said roller on the glass and also independent of relative motion between the support body and said piston means due to unevenness in the glass surface being scored.

2. The apparatus of claim 1 further characterized by a second pressure roller parallel said at least one roller and rotatable on the same axis but located on the opposite side of said glass scoring wheel from said at least one roller.

3. The apparatus of claim 1 further characterized by fluid motor means defined in part by said piston means and in part by said glass scoring wheel support means and so arranged as to provide an additional biasing means between said piston means and said wheel support means to supplement the cutting force available from the biasing means defined in claim 1 for achieving said cutting force.

4. The apparatus of claim 1 wherein said glass scoring wheel support means includes an elongated support tube slidably received in a central bore in said piston means, and an elongated stem for said support tube, said stem having a lower end for receiving a conventional pillar post in which the glass scoring wheel is provided for the castering action referred to, and said stem having an upper end which includes means for releasably retaining said elongated stem in the upper end of said support table.

5. The apparatus of claim 4 further characterized by fluid motor means defined in part by said piston means and in part by said glass scoring wheel support means and so arranged as to provide an additional biasing means between said piston means and said wheel support means to supplement the cutting force available from the biasing means defined in claim 1 for achieving said cutting force.

6. The apparatus of claim 5 wherein said fluid motor part defined by said scoring wheel support means comprises a piston sleeve slidably received on said support tube, and said biasing means for providing said cutting force including a compression spring encircling said support tube and acting between a lower end of said tube and said piston sleeve, and said fluid motor part defined by said piston means comprising a cylinder attached to said piston means for slidably receiving said piston sleeve and defining a chamber therebetween which can be pressurized to so supplement said cutting force.

7. The apparatus of claim 6 wherein said support body defines a cylindrical chamber for slidably receiving an intermediate annular portion of said piston means, and said biasing means for said pressure roller comprising a pressurized fluid for the space in said cylindrical chamber between said support body and said intermediate portion of said piston means.

8. The apparatus of claim 6 further characterized by said piston means being of annular cross section, and means to prevent rotation of said piston means in said support body cylindrical chamber and return biasing means to urge said piston means upwardly away from the glass toward a stop defined by said rotation preventing means except when said space is so pressurized.

9. The apparatus of claim 8 wherein said one pressure roller is rotatably mounted on a lower portion of said annular piston means and more particularly on a stub axle provided in the side wall of said annular piston means, and a second pressure roller diametrically opposite said one roller on a second stub shaft aligned with the first mentioned stub shaft.

* * * * *